United States Patent
Kawahito

(10) Patent No.: US 10,902,020 B2
(45) Date of Patent: Jan. 26, 2021

(54) MULTIPLE CACHE PROCESSING OF STREAMING DATA

(71) Applicant: International Business Machines Corporation, Armonk, NY (US)

(72) Inventor: Motohiro Kawahito, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 16/004,020

(22) Filed: Jun. 8, 2018

(65) Prior Publication Data

US 2019/0377822 A1 Dec. 12, 2019

(51) Int. Cl.
- *G06F 16/00* (2019.01)
- *G06F 16/27* (2019.01)
- *G06F 16/2455* (2019.01)

(52) U.S. Cl.
CPC ...... *G06F 16/275* (2019.01); *G06F 16/24552* (2019.01); *G06F 16/24568* (2019.01)

(58) Field of Classification Search
CPC ............... G06F 12/0806; G06F 16/275; G06F 2212/1032
USPC ............................... 707/600–899; 711/1–221
See application file for complete search history.

(56) References Cited

U.S. PATENT DOCUMENTS

| | | | |
|---|---|---|---|
| 7,831,642 B1 * | 11/2010 | Kumaresan | G06F 12/0804 707/822 |
| 7,865,463 B2 | 1/2011 | Sollicito et al. | |
| 8,068,512 B2 | 11/2011 | Nitta | |
| 9,104,684 B2 * | 8/2015 | Hotz | G06F 16/24552 |
| 2005/0044080 A1 * | 2/2005 | Fridella | G06F 16/10 |
| 2007/0067573 A1 * | 3/2007 | Bruening | G06F 9/3851 711/125 |
| 2008/0320231 A1 * | 12/2008 | Kinter | G06F 12/0833 711/141 |
| 2009/0037498 A1 * | 2/2009 | Mukherjee | G06F 9/5005 |
| 2010/0174863 A1 * | 7/2010 | Cooper | G06F 16/27 711/113 |
| 2010/0333095 A1 * | 12/2010 | Shavit | G06F 9/30087 718/102 |
| 2011/0131378 A1 * | 6/2011 | Dai | G06F 12/0815 711/129 |

(Continued)

OTHER PUBLICATIONS

Hetsch, Léonard, "Multi-layer caching with PHP, Redis and APC", Jan. 25, 2017, 4 pages. <http://leohetsch.com/multi-layer-cache-php-redis-apc/>.

(Continued)

*Primary Examiner* — Michelle N Owyang
(74) *Attorney, Agent, or Firm* — Robert J. Shatto

(57) ABSTRACT

A computer provides a first cache area and a second cache area on a cache memory in a data processing system comprising a database repository and the cache memory for the database repository. The computer receives, in a first time window, streaming data and writing the streaming data on the first cache area. The computer prohibits, in the first time window, carrying out synchronization between the first cache area and the database repository. The computer enables, in at least part of the first time window, synchronization between the database repository and the second cache area. The computer enables, upon elapse of the first time window, synchronization between the first cache area and the database repository.

20 Claims, 10 Drawing Sheets

(56) References Cited

U.S. PATENT DOCUMENTS

| | | | |
|---|---|---|---|
| 2012/0260041 A1 | 10/2012 | Habusha et al. | |
| 2014/0258255 A1* | 9/2014 | Merriman | G06F 16/1827 |
| | | | 707/704 |
| 2014/0379645 A1* | 12/2014 | Wickremesinghe | G06F 11/203 |
| | | | 707/624 |
| 2015/0019812 A1* | 1/2015 | Ban | G06F 16/273 |
| | | | 711/122 |
| 2015/0193311 A1* | 7/2015 | Provizor | G06F 11/1456 |
| | | | 707/649 |
| 2017/0154053 A1 | 6/2017 | Thomas et al. | |
| 2017/0185645 A1 | 6/2017 | Agarwal | |
| 2017/0242889 A1 | 8/2017 | Zhao | |
| 2018/0007112 A1 | 1/2018 | Akerfeldt | |
| 2019/0147077 A1* | 5/2019 | McKenney | G06F 16/2315 |
| | | | 707/615 |
| 2020/0012438 A1 | 1/2020 | Liu et al. | |

OTHER PUBLICATIONS

Zou, et al., "From a Stream of Relational Queries to Distributed Stream Processing", Conference on Very Large Data Bases (VLDB), Sep. 2010, 25 pages, <http://hirzels.com/martin/papers/vldb10-rel2str-slides.pdf>.

International Search Report and Written Opinion, International Application No. PCT/IB2019/054733, dated Oct. 12, 2019, 9 pgs.

* cited by examiner

MULTIPLE CACHE PROCESSING OF STREAMING DATA

BACKGROUND

The present invention relates to a streaming computing, and more specifically, to processing streaming data.

Streaming computing is a computing paradigm that reads data continuously obtained from potentially thousands of data sources such as software or hardware sensors in a stream form and then computes streaming data to provide an analysis result of the computing.

Streaming data may be a wide variety of data as follows: for example, financial transaction data; log file data generated by any sensors such as Internet of Things (IoT) devices, electric energy-meters, gas-meters, water-meters, in-game player activity, mobile or web applications, RFID tag, IC cards including a commuter pass or a credit card, or text information obtained from a microblog. Streaming data may have, but are not limited to, small sizes (for example, on the order of kilobytes).

Often, streaming data needs to be processed sequentially and further incrementally on a record-by-record basis or over sliding time windows, and can be used for a wide variety of analytics such as correlations, aggregations, filtering, and sampling.

Processing of streaming data can be beneficial in scenarios where new, dynamic data is generated continuously. Accordingly, the processing of the streaming data requires ingesting streaming data in real-time and updating a database repository using a cache memory.

There are some known techniques for processing streaming data, each with drawbacks. One traditional solution uses a database cache and in-memory database as a database cache. However, this traditional solution has a drawback of poor real-time performance. This traditional solution provides for an application which can read/write from a database cache and a database which synchronizes data with the database cache periodically. The database cache is locked during synchronization with the database and therefore, accesses (read and/or write) from the application are halted during synchronization. Accordingly, real-time performance cannot be achieved according to the aforesaid traditional solution. This traditional solution will be referred to herein as TS1.

Another known technique uses a stream-based database cache. However, this solution has a drawback of inconsistency for newly incoming data. This technique involves an application which can write to a database, the database synchronizes periodically with a database caches, and the application can read data from the database cache. Incoming data is first directly written into the database and then the synchronization is done between the database and the database cache. Therefore, if the application attempts to read the newly incoming data before the synchronization is completed it may find no data. In other words, the application can read newly incoming data only after the synchronization is completed. Accordingly, consistency for newly incoming data cannot be achieved according to the aforesaid solution.

A third known technique involves a multi-layer caching system which means data retrieved from the main database will be first cached into the global Redis datastore (slow global cache), and also into the local APC cache (fast local cache). However, the multi-layer caching system requires extra time to read newly incoming data. In this technique, a writing operation is carried out by writing incoming data on the both the global cache and the database. A reading operation is carried out first by reading data from the local cache and, if data is not found on the local cache, the data is copied first from the database to the global cache and then subsequently from the global cache to the local cache to read data from the local cache. Therefore, consistency for newly incoming data can be achieved, but extra time is required to read newly incoming data due to the copying of the newly incoming data from the database to the global cache and then subsequently from the global cache to the local cache or the copying of the newly incoming data from the global cache to the local cache. Accordingly, real-time performance cannot be achieved according to the multi-layer caching system.

Accordingly, compared to all known techniques, there may be a previously unmet need to satisfy consistency for newly incoming data and real-time performance in processing streaming data.

SUMMARY

Aspects of the present invention are directed to a method, data processing system, and computer program product for processing streaming data.

A computer provides a first cache area and a second cache area on a cache memory in a data processing system comprising a database repository and the cache memory for the database repository. The computer receives, in a first time window, streaming data and writing the streaming data on the first cache area. The computer prohibits, in the first time window, carrying out synchronization between the first cache area and the database repository. The computer enables, in at least part of the first time window, synchronization between the database repository and the second cache area. The computer enables, upon elapse of the first time window, synchronization between the first cache area and the database repository.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. The figures are not necessarily to scale. The figures are merely schematic representations, not intended to portray specific parameters of the disclosure. The figures are intended to depict only typical embodiments of the disclosure. In the figures, like numbering represents like elements.

Figure 1:
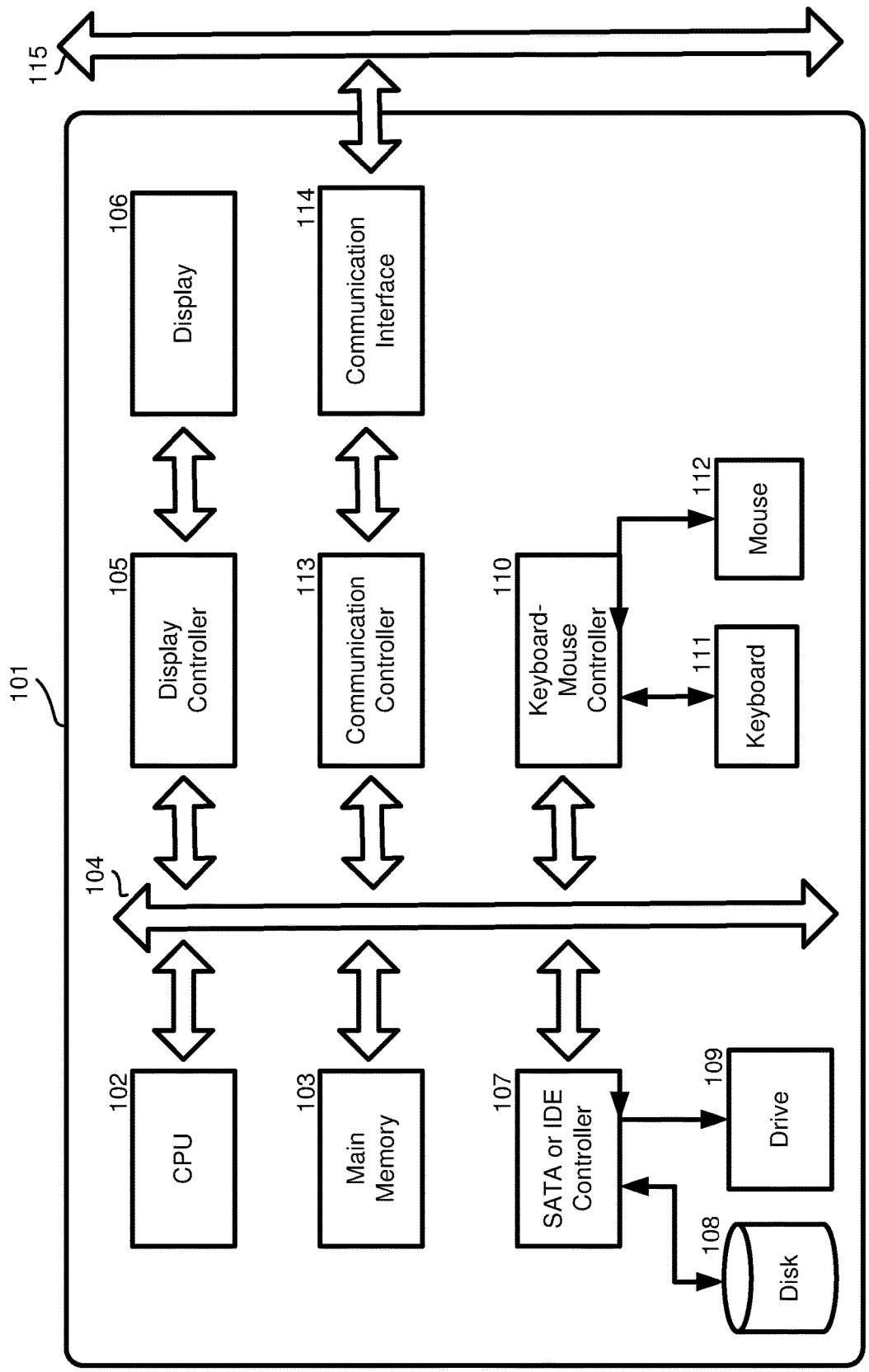
FIG. 1 is a block diagram depicting a computer system used as a data processing system in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

As will be appreciated by those of skill in the art, embodiments of the present disclosure may be a method, a computer system, or a computer program product. Accordingly, an embodiment of the present disclosure may take the form of an entirely hardware-based embodiment, an entirely software-based embodiment, including, for example, firmware, resident software and micro-code, and the like, or may take the form of an embodiment combining software-based and hardware-based aspects, which may be collectively referred to herein as a "circuit," a "module," or a "system."

As used herein, the expression "a/one" should be understood as "at least one." The expression "comprise(s)/comprising a/one" should be understood as "comprise(s)/comprising at least one." The expression "comprise(s)/comprising" should be understood as "comprise(s)/comprising at least." The expression "/" should be understood as "and/or."

To define more clearly terms as used herein, exemplified definitions of the terms are provided hereinafter, this should be interpreted broadly as known to a person skilled in the art or a technical field to which the present disclosure pertains.

As used herein, the term "streaming data" may refer to any data which is generated continuously. Streaming data may be obtained from the same source or different sources, for example, but not limited to, financial transaction; any sensors such as Internet of Things (IoT) devices, electric energy-meters, gas-meters, water-meters, in-game player activity, mobile or web applications, RFID tag, IC cards including a commuter pass and a credit card, or a microblog.

As used herein, the term "database repository" may refer to any storage for storing streaming data. The database repository may be one or more databases. The database repository may store any data including metadata.

As used herein, the term "cache memory" may refer to a memory which can store streaming data temporarily and be used as a cache for a database repository. Streaming data may be synchronized between the database repository and a cache memory.

As used herein, the term "application" may refer to any application which may read data from the cache memory and/or write data on the cache memory. The application used in an embodiment of the present disclosure may be an application to which a time window is originally set. The application to which a time window is originally set may deal with for example, but not limited to, the following data: a crawl data such as periodic crawl data, batch processing data, or sensor data such as electric energy-meter data, gas-meter data, or water-meter data. The application used in some embodiments of the present disclosure may be an application in which data records have no dependency with each other.

With reference now to FIG. 1, depicted is a block diagram depicting a computer system used as a data processing system in accordance with embodiments of the present disclosure.

A computer system (101) may be, for example, but is not limited to, a desktop, a laptop, a notebook, or a server computer. The server computer may be, for example, but is not limited to, a workstation, a rack-mount type server, a blade type server, a mainframe server, or a cloud server and may run, for example, a hypervisor for creating and running one or more virtual machines. The computer system (101) may comprise one or more CPUs (102) and a main memory (103) connected to a bus (104). The CPU (102) may be based, for example, but is not limited to, on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. The display may have a touch screen or a non-touch screen. The display may be for example, but not limited to, an LCD, plasma display panel (PDP), organic electro-luminescence (OEL), or a projection type display. A disk (108) such as a hard disk or a solid-state drive (SSD), and a drive (109) such as a CD, a DVD, or a BD (Blu-ray disk) drive may be connected to the bus (104) via a SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install one or more programs, such as the computer program of an embodiment of the present disclosure, readable from a CD-ROM, a DVD-ROM, or a BD to the disk (108) or to load any data readable from a CD-ROM, a DVD-ROM, or a BD into the main memory (103) or the disk (108), as appropriate.

A communication interface (114) may be based on, for example, but is not limited to, the Ethernet protocol. The communication interface (114) may be connected to the bus (104) via a communication controller (113), may physically connect the computer system (101) to a communication line (115), and may provide a network interface layer to the TCP/IP communication protocol of a communication function of the operating system of the computer system (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

FIGS. 2A, 2B, 3A, and 3B each illustrate different block diagrams depicting a method of processing streaming data in accordance with embodiments of the present disclosure.

Figure 2A:
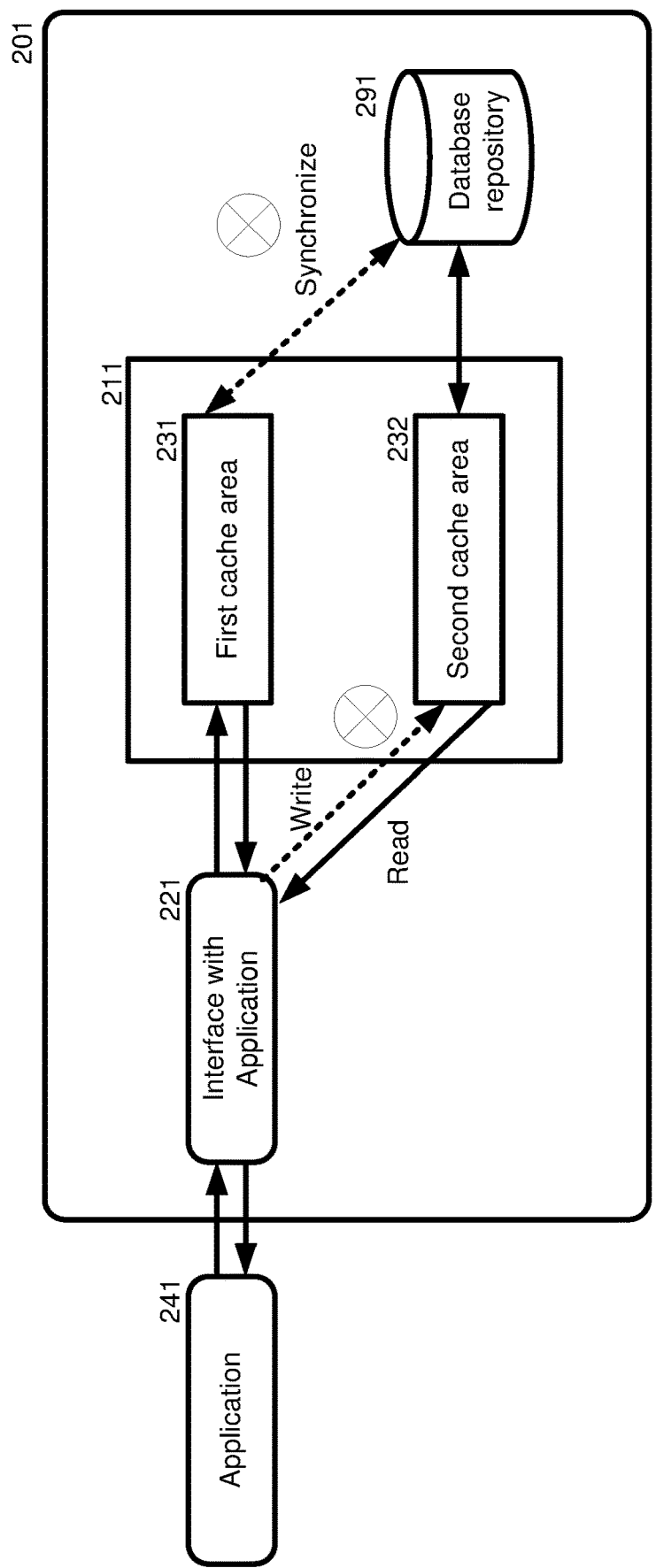
FIGS. 2A and 2B are block diagrams depicting a method of processing streaming data, in accordance with embodiments of the present disclosure.
Figure 2B:
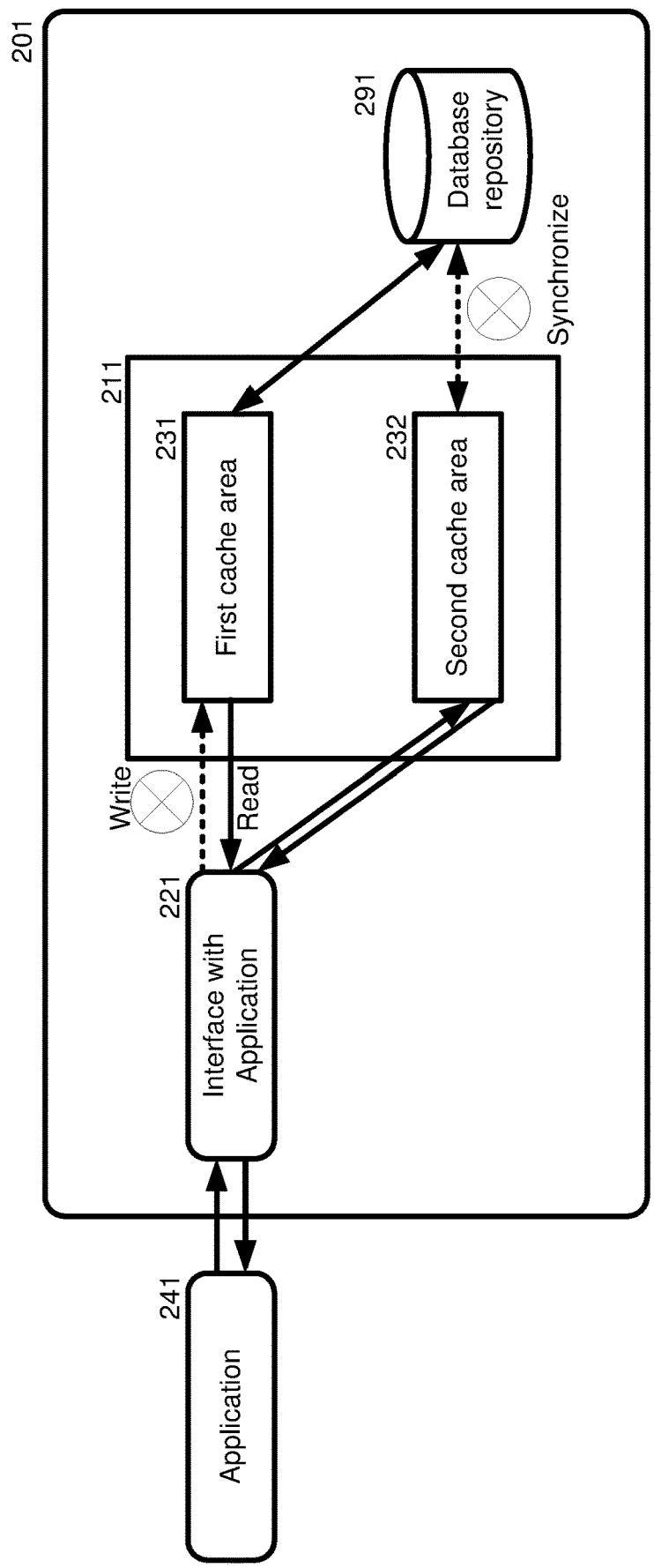

With reference now to FIGS. 2A and 2B, FIGS. 2A and 2B illustrate an embodiment where a cache memory has one pair of a first cache area and a second cache area.

The data processing system (201) may correspond to the computer system (101) described in FIG. 1. The data processing system (201) may have one or more processors (not shown); and a memory (not shown) storing a program which, when executed on the processor, performs an operation according to an embodiment of the present disclosure. Further, the data processing system (201) may have a cache memory (211), an interface with an application (221) and a database repository (291), and optionally an application (241).

The cache memory (211) may be used for storing streaming data temporarily prior to storing the streaming data into the database repository (291) and can be accessed from the application (241) through the interface (221).

The interface (221) may be used for receiving an instruction of writing data on the cache memory (211), an instruction of reading data from the cache memory (211), or a combination thereof.

The application (241) may be capable of accessing the cache memory (211) for real-time processing of incoming streaming data. The application (241) may send, to the data processing system (201), an instruction of writing data on the cache memory (211), an instruction of reading data from the cache memory (211), or a combination thereof. The application (241) can be stored in the memory equipped in the data processing system (201); or can be stored in a system which is different from the data processing system (201) and access the cache memory (211) through the interface (221).

The database repository (291) may be used for storing streaming data.

With reference now to FIG. 2A, the data processing system (201) first provides a first cache area (231) and a second cache area (232) on the cache memory (211). In order to provide the first cache area (231) and the second cache area (232), the data processing system (201) may specify, on the cache memory (211), an address used for the first cache area (231) and also an address used for the second cache area (232).

The first cache area (231) and the second cache area (232) each has either of the following role: one is to write the streaming data incoming in a predefined time window on its cache area without carrying out synchronization between its cache area and the database repository (291); the other is to synchronize data between the database repository and the second cache area in the aforesaid predefined time window. Upon elapse of the aforesaid predefined time window, the role of the first cache area is swapped with the role of the second cache area. This swapping is repeatedly done upon elapse of a next time window (second, third, fourth, etc., time window).

As shown in FIG. 2A, the first cache area (231) first has a role to write the streaming data incoming in a predefined time window (hereinafter also referred to as "a first time window") on the first cache area (231) without carrying out synchronization between the first cache area (231) and the database repository (291); and the second cache area (232) first has a role to synchronize data between the database repository (291) and the second cache area (232) in the first time window.

The data processing system (201) receives the streaming data which is incoming in the first time window. The data processing system (201) writes the streaming data on the first cache area (231) in the first time window without carrying out synchronization between the first cache area (231) and the database repository (291). Thus, synchronization between the first cache area (231) and the database repository (291) is not allowed in the first time window (as indicated in FIG. 2A by a dotted line and an encircled "X"). Meanwhile, synchronization between the database repository (291) and the second cache area (232) is permitted in at least part of the first time window. For example, the permission of the synchronization is done until the synchronization between the database repository (291) and the second cache area (232) is completed.

In some embodiments, in the first time window, the first cache area (231) may be locked using a table lock, for example, until an operation of writing streaming data on the first cache area (231) is finished; and the second cache area (232) may be locked using a table lock, for example, until synchronization between the second cache area (232) and the database repository (291) is finished in order to prohibit a writing of the streaming data on the second cache area (232). The lock for the first cache area (231) using a table lock may be done by locking the whole of the first cache area (231) on an access to the first cache area (231) from the application (241). Similarly, the lock for the second cache area (232) using a table lock may be done by locking the whole of the second cache area (232) on an access to the second cache area (232) from the application (241).

In some embodiments, in the first time window, the first cache area (231) may be locked using a hash index basis, for example, until an operation of writing the streaming data on the first cache area (231) is finished; and the second cache area (232) may be locked using a table lock, for example, until synchronization between the second cache area (232) and the database repository (291) is finished in order to prohibit a writing of the streaming data on the second cache area (232). The lock for the first cache area (231) using a hash index basis may be done by locking the first cache area (231) on the basis of a hash index basis on an access to the first cache area (231) from the application (241). The lock for the second cache area (232) using a table lock may be done by locking the whole of the second cache area (232) on an access to the second cache area (232) from the application (241).

In the first time window, the application (241) may read the data on the second cache area (232), but is not allowed to write data on the second cache area (232) (as indicated in FIG. 2A by a dotted line and an encircled "X") due to the aforesaid lock done for the second cache area (232).

With reference now to FIG. 2B, depicted is the same environment wherein the first time window is now elapsed. Upon the elapse of the first time window, the data processing system (201) swaps the role of the first cache area with the role of the second cache area. The data processing system (201) enables synchronization between the first cache area (231) and the database repository (291) upon the elapse of the first time window (as indicated in FIG. 2B by a solid line and no encircled "X"). Meanwhile, the data processing system (201) inhibits synchronization between the database repository (291) and the second cache area (232) upon the elapse of the first time window (as indicated in FIG. 2B by a dotted line and an encircled "X").

After the elapse of the first time window, the new time window (i.e. a second time window) starts. The data processing system (201) writes newly incoming streaming data on the second cache area (232) in the second time window without carrying out synchronization between the database repository (291) and the second cache area (232). Thus, synchronization between the database repository (291) and the second cache area (232) is not allowed in the second time window. Meanwhile, synchronization between the first cache area (231) and the database repository (291) is permitted in at least part of the second time window.

In some embodiments, in the second time window, the second cache area (232) may be locked using a table lock, for example, until an operation of writing the newly incoming streaming data on the second cache area (232) is finished; and the first cache area (231) may be locked using a table lock, for example, until synchronization between the database repository (291) and the first cache area (231) is finished in order to prohibit a writing of the streaming data on the first cache area (231). The lock for the second cache area (232) using a table lock may be done by locking the whole of the second cache area (232) on an access to the second cache area (232) from the application (241). Similarly, the lock for the first cache area (231) using a table lock may be done by locking the whole of the first cache area (231) on an access to the first cache area (231) from the application (241).

In some embodiments, in the second time window, the second cache area (232) may be locked using a hash index basis, for example, until an operation of writing the newly incoming streaming data on the second cache area (232) is finished; and the first cache area (231) may be locked using a table lock, for example, until synchronization between the database repository (291) and the first cache area (231) is finished in order to prohibit a writing of the newly incoming streaming data on the first cache area (231). The lock for the second cache area (232) using a hash index basis may be done by locking the second cache area (232) on the basis of a hash index basis on an access to the second cache area (232) from the application (241). The lock for the first cache area (231) using a table lock may be done by locking the whole of the first cache area (231) on an access to the first cache area (231) from the application (241).

In the second time window, the application (241) may read the data on the first cache area (231), but is not allowed to write data on the first cache area (231) (as indicated in FIG. 2B by a dotted line and an encircled "X") due to the aforesaid lock done for the first cache area (231).

With reference now back to FIG. 2A, upon the elapse of the second time window, the data processing system (201) again swaps the role of the first cache area with the role of the second cache area. Accordingly, the data processing system (201) processes the newly incoming data in a third time window, according to the block diagram described in FIG. 2A.

As stated above, in elapse of a predefine time window, the data processing system (201) swaps the role of the first cache area with the role of the second cache area to process the streaming data. This swapping can continue indefinitely with odd numbered (e.g., first, third, fifth) time windows using the roles depicted in FIG. 2A and even numbered (e.g. second, fourth, sixth) time windows using the roles depicted in FIG. 2B.

The embodiments described in FIGS. 2A and 2B enable real-time performance together with consistency for newly incoming streaming data.

Figure 3A:
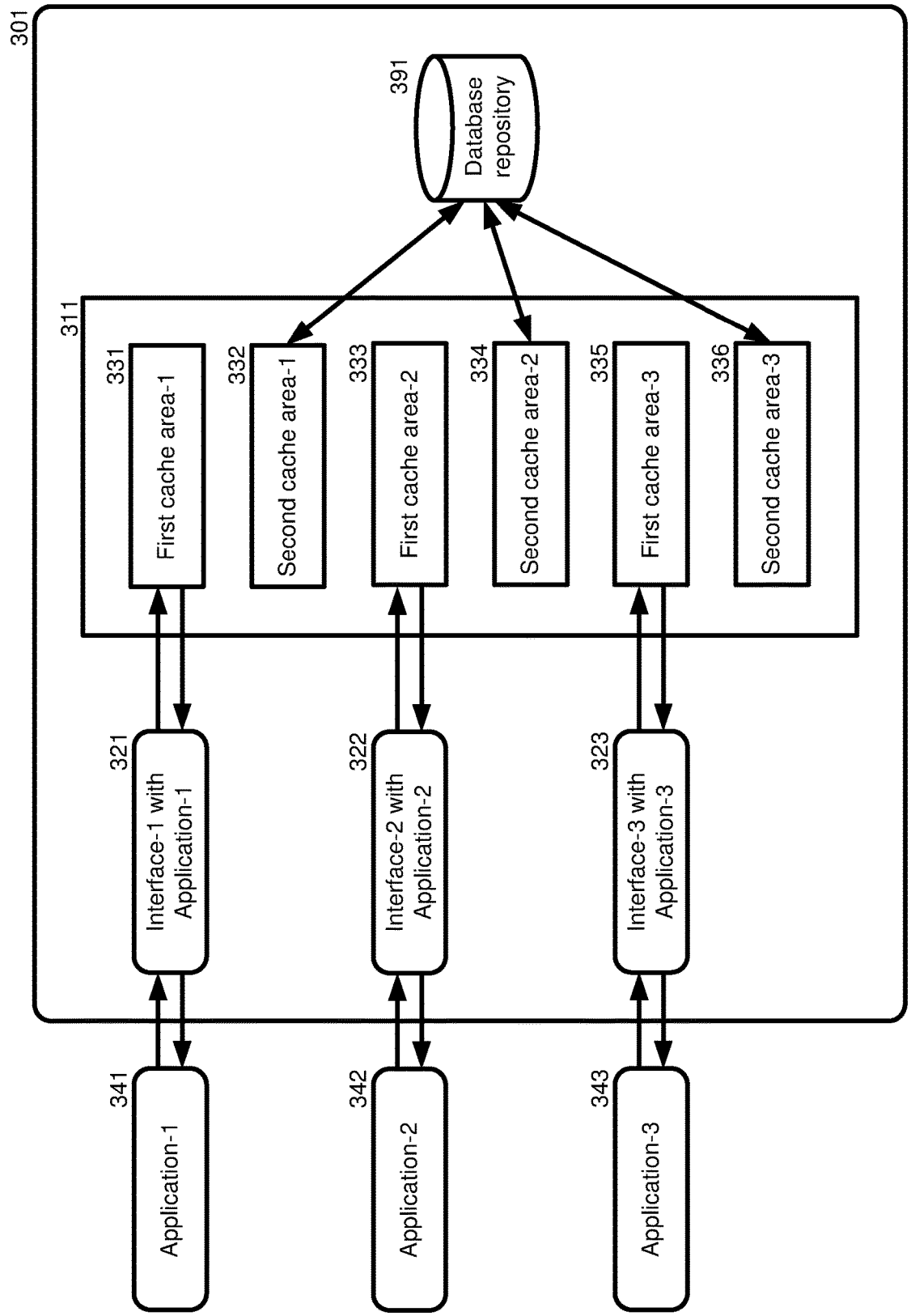
FIGS. 3A and 3B are block diagrams depicting a method of processing streaming data, in accordance with embodiments of the present disclosure.
Figure 3B:
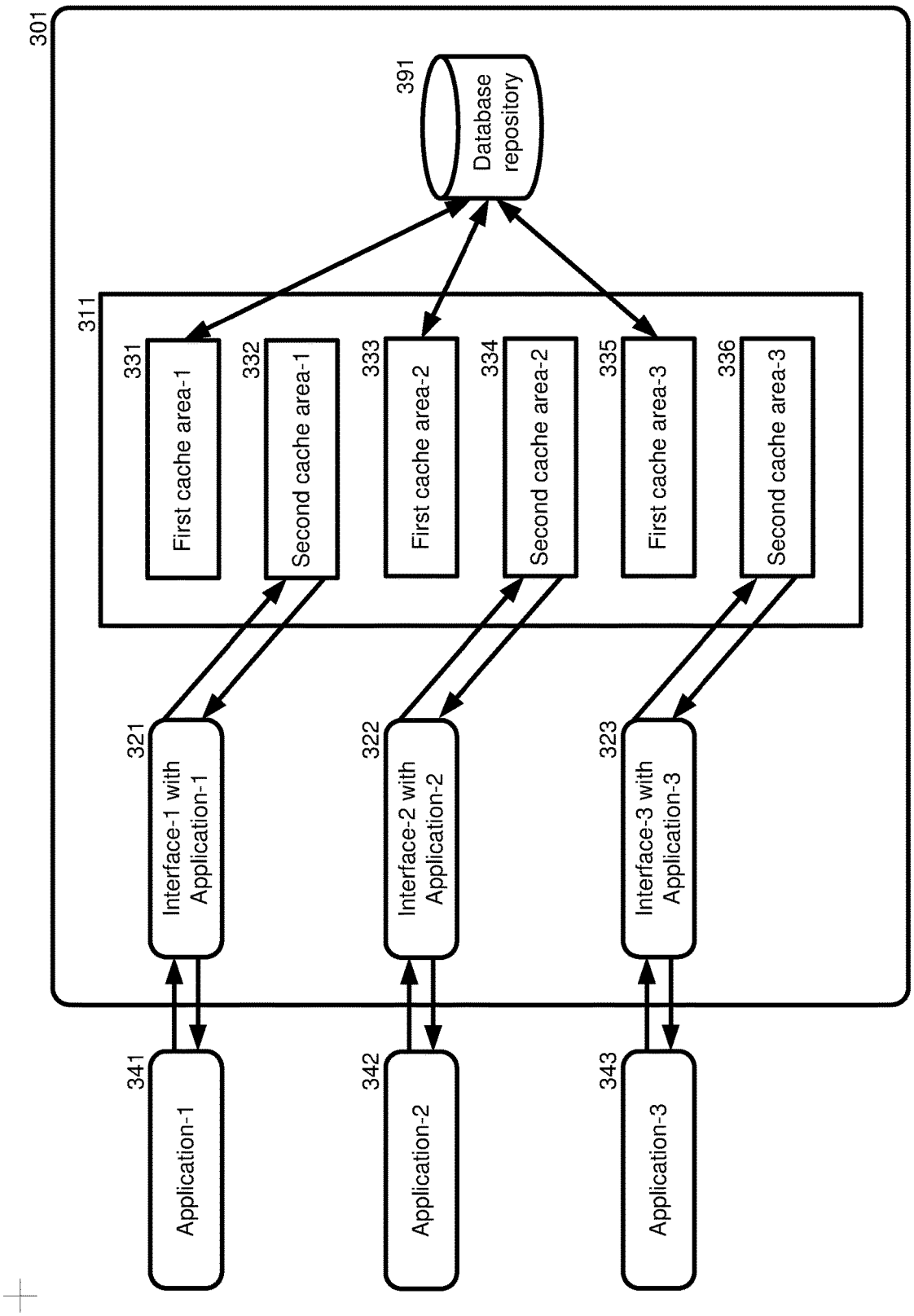

With reference now to FIGS. 3A and 3B, illustrated is an embodiment where a cache memory has multiple pairs of first cache areas and second cache areas.

The data processing system (301) may correspond to the computer system (101) described in FIG. 1. The data processing system (301) may have one or more processors (not shown); and a memory (not shown) storing a program which, when executed on the processor, performs an operation according to an embodiment of the present disclosure. Further, the data processing system (301) may have a cache memory (311), plural interfaces (321, 322 and 323) with an application and a database repository (391), and optionally plural applications (341, 342 and 343).

FIGS. 3A and 3B illustrate three interfaces (321, 322, and 323) and three applications (341, 342, and 343). However, the number of interfaces and applications may be varied depending on the implementation of embodiments of the present disclosure.

Further, FIGS. 3A and 3B illustrate that one application is associated with one interface as a pair of the application and the interface (341 and 321; 342 and 322; and 343 and 323 as the pair) and further that one interface is associated with one pair of first and second cache areas. However, one application may be associated with one or more interfaces or vice versa, and one interface may be associated with one or more pairs of first and second cache areas or vice versa.

The cache memory (311) corresponds to the cache memory (211) described in FIGS. 2A and 2B. The cache memory (311) comprises the following three pairs of the first cache area and the second cache area: the first pair of the first cache area-1 (331) and the second cache area-1 (332); the second pair of the first cache area-2 (333) and the second cache area-2 (334); and the third pair of the first cache area-3 (335) and the second cache area-3 (336).

The interfaces (321, 322, and 323) correspond to the interface (221) described in FIGS. 2A and 2B. The interface-1 (321) may be used for receiving, from the application-1 (341) an instruction of writing data on the first cache area-1 (331) or the second cache area-1 (332), an instruction of reading data from the first cache area-1 (331) or the second cache area-1 (332), or a combination thereof through the interface-1 (321). Similarly, the interface-2 (322) may be used for receiving, from the application-2 (342) an instruction of writing data on the first cache area-2 (333) or the second cache area-2 (334), an instruction of reading data from the first cache area-2 (333) or the second cache area-2 (334) or a combination thereof through the interface-2 (322). Similarly, the interface-3 (323) may be used for receiving, from the application-3 (343) an instruction of writing data on the first cache area-3 (335) or the second cache area-3 (336), an instruction of reading data from the first cache area-3 (335) or the second cache area-3 (336) or a combination thereof through the interface-3 (323).

The applications (341, 342, and 343) correspond to the application (241) described in FIGS. 2A and 2B. The application (341) may send, to the data processing system (301), an instruction of writing data on the first cache area-1 (331) or the second cache area-1 (332), an instruction of reading data from the first cache area-1 (331) or the second cache area-1 (332) or a combination thereof. Similarly, the application (342) may send, to the data processing system (301), an instruction of writing data on the first cache area-2 (333) or the second cache area-2 (334), an instruction of reading data from the first cache area-2 (333) or the second cache area-2 (334) or a combination thereof. Similarly, the application (343) may send, to the data processing system (303), an instruction of writing data on the first cache area-3 (335) or the second cache area-3 (336), an instruction of reading data from the first cache area-3 (335) or the second cache area-3 (336) or a combination thereof. The applications (341, 342 and 343) can be stored in the memory equipped in the data processing system (301); or can be stored in a system which is different from the data processing system (301) and access the cache memory (311) through the interfaces (321, 322, and 323, respectively).

The database repository (391) corresponds to the database repository (291) described in FIGS. 2A and 2B.

With reference now to FIG. 3A, the data processing system (301) first provides the aforesaid first, second and third pairs of a first cache area and a second cache area on the cache memory (311). In order to provide the aforesaid first, second and third pairs, the data processing system (301) may specify, on the cache memory (311), an address used for each of the first cache areas (331, 333, and 335) and also an address used for each of the second cache areas (332, 334 and 336).

The first cache areas (331, 333, and 335) and the second cache areas (332, 334, and 336) have the same role of the first cache area (231) and the second cache area (232) described in FIGS. 2A and 2B, respectively.

As shown in FIG. 3A, the first cache areas (331, 333, and 335) first have the roles to write the streaming data incoming in a predefined time window (hereinafter also referred to as "a first time window") on the first cache areas (331, 333, and 335) without carrying out synchronization between each of the first cache areas (331, 333, and 335) and the database repository (391); and the second cache areas (332, 334, and 336) first have the roles to synchronize data between the database repository (391) and second cache areas (332, 334, and 336, respectively) in the first time window.

The data processing system (301) receives the streaming data which is incoming in the first time window. The data processing system (201) writes the streaming data on the on the first cache areas (331, 333, and 335) in the first time window without carrying out synchronization between each of the first cache areas (331, 333, and 335) and the database repository (391). Thus, synchronization between each of the first cache areas (331, 333, and 335) and the database repository (391) is not allowed in the first time window (as indicated in FIG. 3A by no connection between first cache areas (331, 333, and 335) and the database repository (391)).

Meanwhile, synchronization between the database repository (391) and each of the second cache areas (332, 334, and 336) is permitted in at least part of the first time window. For example, the permission of the synchronization is done until the synchronization between the database repository (391) and each of the second cache areas (332, 334, and 336) is completed.

In some embodiments, in the first time window, each of the first cache areas (331, 333, and 335) may be locked using a table lock, for example, until an operation of writing streaming data on each of the first cache areas (331, 333, and 335) is finished; and each of the second cache areas (332, 334, and 336) may be locked using a table lock, for example, until synchronization between each of the second cache areas (332, 334, and 336) and the database repository (391) is finished in order to prohibit a writing of the streaming data on the second cache areas (332, 334, and 336). The lock for the first cache areas (331, 333, and 335) using a table lock may be done by locking the whole of the first cache areas (331, 333, and 335, respectively) on an access to the first cache areas (331, 333, and 335, respectively) from the application (341, 342, and 343, respectively). Similarly, the lock for the second cache areas (332, 334, and 336) using a table lock may be done by locking the whole of the second cache areas (332, 334, and 336, respectively) on an access to the second cache areas (332, 334, and 336, respectively) from the application (341, 342, and 343, respectively).

In some embodiments, in the first time window, the first cache areas (331, 333, and 335) may be locked using a hash index basis, for example, until an operation of writing the streaming data on the first cache areas (331, 333, and 335, respectively) is finished; and the second cache areas (332, 334, and 336) may be locked using a table lock, for example, until synchronization between the second cache areas (332, 334, and 336, respectively) and the database repository (391) is finished in order to prohibit a writing of the streaming data on the second cache areas (332, 334, and 336, respectively). The lock for the first cache areas (331, 333, and 335) using a hash index basis may be done by locking the first cache areas (331, 333, and 335, respectively) on the basis of a hash index basis on an access to the first cache areas (331, 333, and 335, respectively) from the application (341, 342, and 343, respectively). The lock for the second cache areas (332, 334, and 336) using a table lock may be done by locking the whole of the second cache areas (332, 334, and 336, respectively) on an access to the second cache areas (332, 334, and 336, respectively) from the application (341, 342, and 343, respectively).

In the first time window, the application (341, 342, and 343) may read the data on the second cache areas (332, 334, and 336, respectively), but is not allowed to write data on the second cache areas (332, 334, and 336, respectively) (as indicated in FIG. 3A by no connection between first cache areas (331, 333, and 335) and the application (341, 342, and 343)) due to the aforesaid lock done for the second cache areas (332, 334, and 336, respectively).

With reference now to FIG. 3B, depicted is the same environment wherein the first time window is now elapsed. Upon the elapse of the first time window, the data processing system (301) swaps the role of the first cache area with the role of the second cache area in each of the aforesaid first, second, and third pairs. The data processing system (301) enables synchronization between each of the first cache areas (331, 333, and 335) and the database repository (391) upon the elapse of the first time window. Meanwhile, the data processing system (301) inhibits synchronization between the database repository (391) and each of the second cache areas (332, 334, and 336) upon the elapse of the first time window (as indicated in FIG. 3B by no connection between second cache areas (332, 334, and 336) and the database repository (391)).

After the elapse of the first time window, the new time window (i.e. a second time window) starts. The data processing system (301) writes newly incoming streaming data on the second cache areas (332, 334, and 336) in the second time window without carrying out synchronization between the database repository (391) and each of the second cache areas (332, 334, and 336). Thus, synchronization between the database repository (391) and each of the second cache areas (332, 334 and 336) is not allowed in the second time window. Meanwhile, synchronization between each of the first cache areas (331, 333, and 335) and the database repository (391) is permitted in at least part of the second time window. For example, the permission of the synchronization is done until the synchronization between each of the first cache areas (331, 333, and 335) and the database repository (391) is completed.

In some embodiments, in the second time window, the second cache areas (332, 334, and 336) may be locked using a table lock, for example, until an operation of writing the newly incoming streaming data on the second cache areas (332, 334, and 336, respectively) is finished; and the first cache areas (331, 333, and 335) may be locked using a table lock, for example, until synchronization between the database repository (391) and the first cache areas (331, 333, and 335, respectively) is finished in order to prohibit a writing of the streaming data on the first cache areas (331, 333, and 335, respectively). The lock for the second cache areas (332, 334, and 336) using a table lock may be done by locking the whole of the second cache areas (332, 334, and 336, respectively) on an access to the second cache areas (332, 334, and 336, respectively) from the application (341, 342, and 343, respectively). Similarly, the lock for the first cache areas (331, 333, and 335) using a table lock may be done by locking the whole of the first cache areas (331, 333, and 335, respectively) on an access to the first cache areas (331, 333, and 335, respectively) from the application (341, 342, and 343, respectively).

In some embodiments, in the second time window, the second cache areas (332, 334, and 336) may be locked using a hash index basis, for example, until an operation of writing the newly incoming streaming data on the second cache areas (332, 334, and 336, respectively) is finished; and the first cache areas (331, 333, and 335) may be locked using a table lock, for example, until synchronization between the database repository (391) and the first cache areas (331, 333, and 335, respectively) is finished in order to prohibit a writing of the newly incoming streaming data on the first cache areas (331, 333, and 335, respectively). The lock for the second cache areas (332, 334, and 336) using a hash index basis may be done by locking the second cache areas (332, 334, and 336, respectively) on the basis of a hash index basis on an access) to the second cache areas (332, 334, and 336, respectively from the application (341, 342, and 343, respectively). The lock for the first cache areas (331, 333, and 335) using a table lock may be done by locking the whole of the first cache areas (331, 333, and 335, respectively) on an access to the first cache areas (331, 333, and 335, respectively) from the application (341, 342, and 343, respectively).

In the second time window, the application (341, 342, and 343) may read the data on the first cache areas (331, 333, and 335, respectively), but is not allowed to write data on the first cache areas (331, 333, and 335, respectively) (as indicated in FIG. 3B by no connection between first cache areas (331, 333, and 335) and the application (341, 342, and 343)) due to the aforesaid lock done for the first cache areas (331, 333, and 335, respectively).

With reference now back to FIG. 3A, upon the elapse of the second time window, the data processing system (301) again swaps the role of the first cache area with the role of the second cache area in each of the aforesaid first, second and third pairs. Accordingly, the data processing system (301) processes the newly incoming data, according to the block diagram described in FIG. 3A.

As stated above, in elapse of a predefine time window, the data processing system (301) swaps the role of the first cache area with the role of the second cache area in each of the aforesaid first, second and third pairs to process the streaming data. This swapping can continue indefinitely with odd numbered (e.g., first, third, fifth) time windows using the roles depicted in FIG. 3A and even numbered (e.g. second, fourth, sixth) time windows using the roles depicted in FIG. 3B.

The embodiments described in FIGS. 3A and 3B enable real-time performance together with consistency for newly incoming streaming data.

In the embodiments described in FIGS. 3A and 3B, the first, second and third pairs may be used simultaneously in the same time windows.

In another embodiment, the first, second and third pairs may be used in each of the different windows. For example, the first, second and third pairs may be used in order according to the order of the time window. This is done, for example, under the circumstance that the application-1 (341) and the interface-1 (321) are used only and the first, second and third pairs are used by the interface-1 (321) only.

A variety of variants can be applied by a person of ordinary skill in the art using the block diagrams described in FIGS. 3A and 3B.

Figure 4:
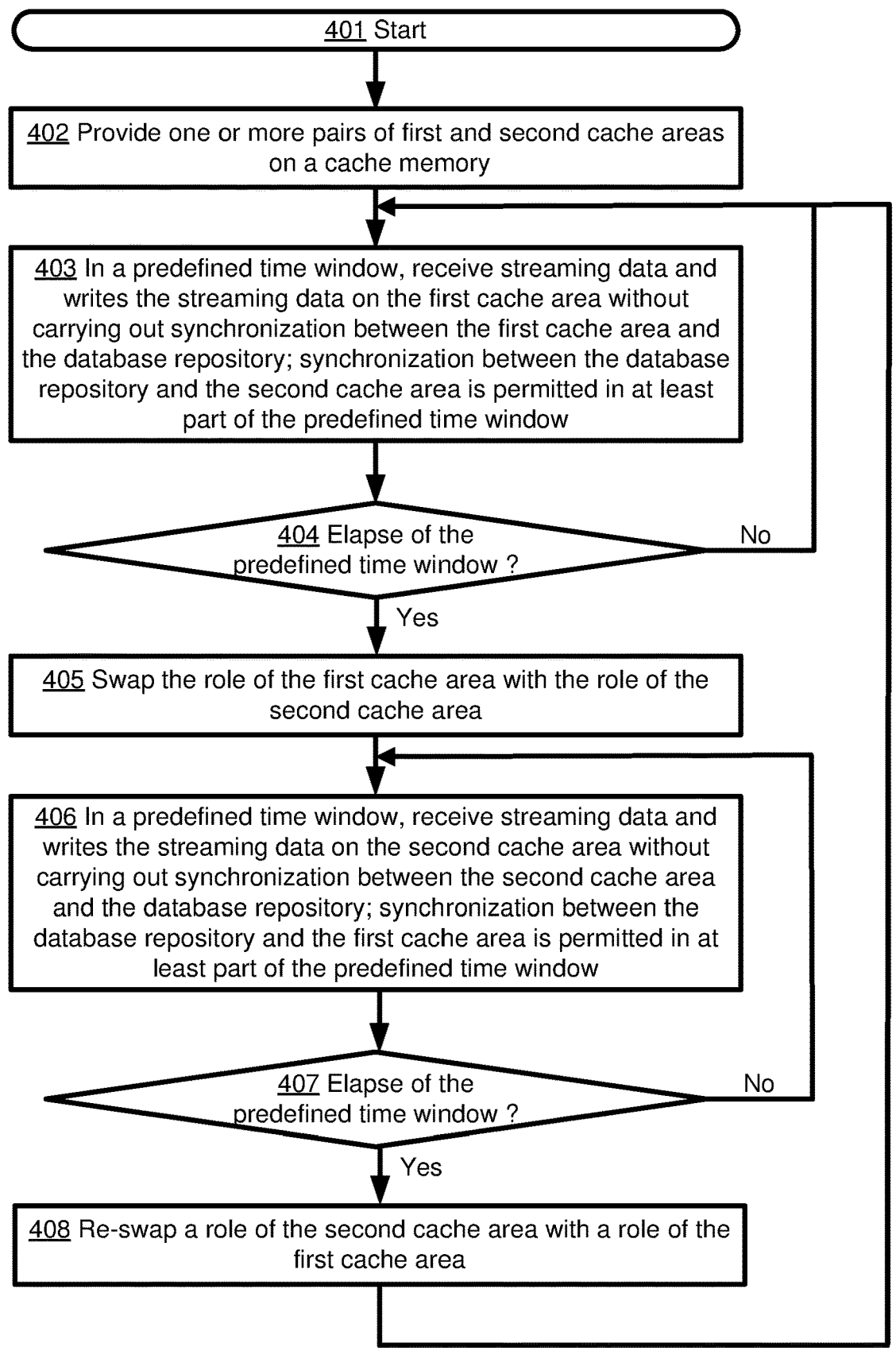
FIG. 4 is a flowchart depicting a process of processing streaming data, in accordance with embodiments of the present disclosure.
Figure 5A:
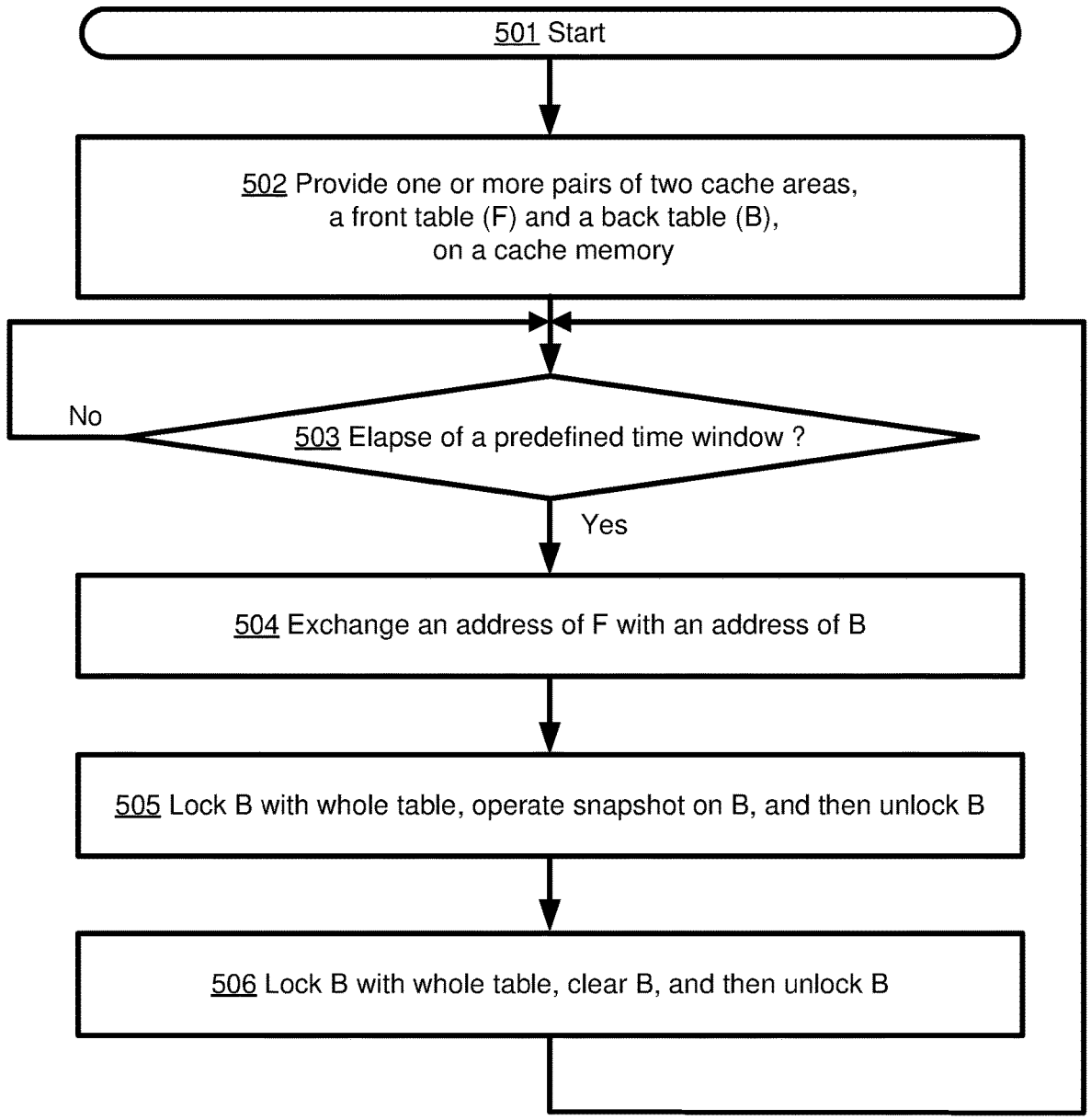
FIGS. 5A and 5B are flowcharts depicting a process of processing streaming data, in accordance with embodiments of the present disclosure.
Figure 5B:
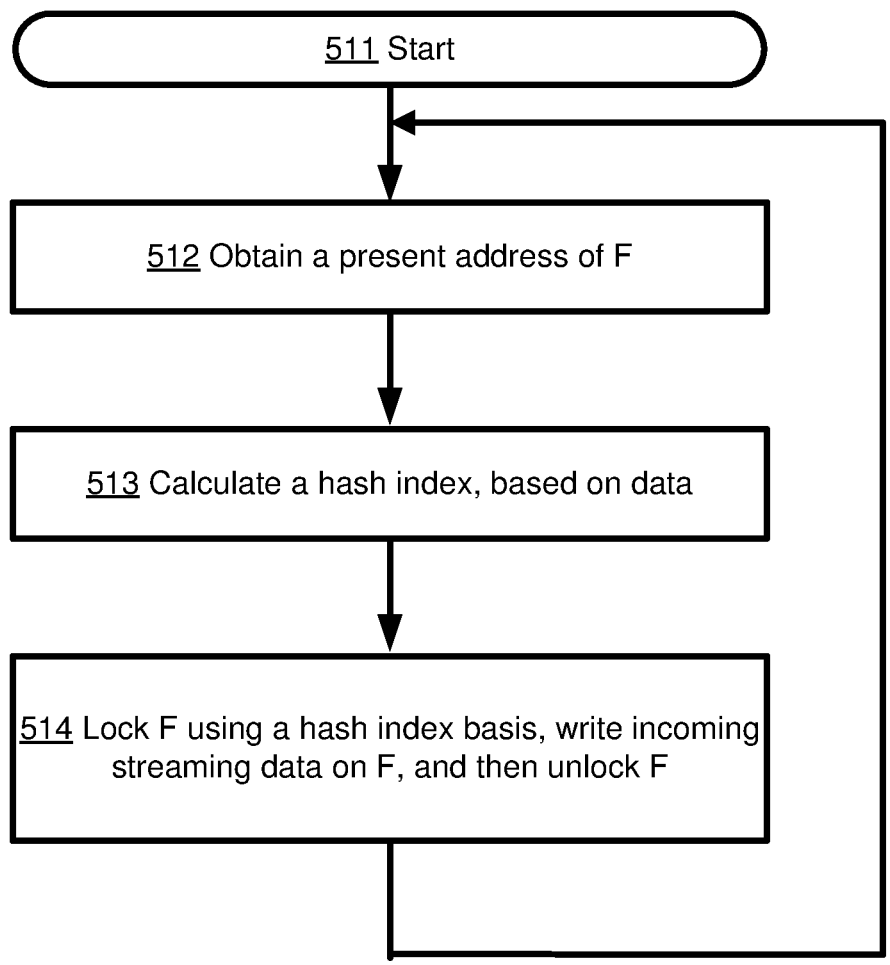

FIG. 4 and FIGS. 5A and 5B each illustrate different flowcharts depicting processes of processing streaming data.

With reference now to FIG. 4, depicted is a flowchart depicting a process of processing streaming data, in accordance with embodiments of the present disclosure.

The subject of each operation may be a data processing system which may correspond to the computer system (101) described in FIG. 1.

At 401, the data processing system starts the process. A length of a predefined window may be defined in advance, manually or automatically, and may depend on data derived from the following data which may have been obtained from past instances of the process: for example, received streaming data, the processing time of the streaming data, time required for synchronizing data with the database repository, or a combination thereof.

At 402, the data processing system provides one or more pairs of first and second cache areas on a cache memory in the data processing system. The data processing system may specify, on the cache memory, an address used for the first cache area and also an address used for the second cache area to provide each of one or more pairs of the first cache area and the second cache area.

At 403, in a predefined time window (a first time window), the data processing system receives streaming data and writes the streaming data on the first cache area without carrying out synchronization between the first cache area and the database repository. Synchronization between the database repository and the second cache area is permitted in at least part of the first time window. Accordingly, the data processing system may carry out the synchronization between the database repository and the second cache area.

In the first time window, the data processing system may lock the whole of the first cache area on an access to the first cache area from the application and further may lock the whole of the second cache area on an access to the second cache area from the application. Alternatively, in the first time window, the data processing system may lock the first cache area on the basis of a hash index basis on an access to the first cache area from the application and further may lock the whole of the second cache area on an access to the second cache area from the application.

At 404, the data processing system determines whether the first time window has elapsed or not. If the first time window has elapsed, the data processing system proceeds to step 405. Otherwise, the data processing system proceeds back to step 403 to repeat step 403.

At 405, upon elapse of the first time window, the data processing system swaps the role of the first cache area with the role of the second cache area.

At 406, the data processing system enables synchronization between the first cache area after the swapping at 405 and the database repository, but inhibits synchronization between the database repository and the second cache area after the swapping at 405. Further, the data processing system writes newly incoming streaming data on the second cache area after the swapping at 405.

Accordingly, in a predefined time window (a second time window), the data processing system receives newly incoming streaming data and writes the newly incoming streaming data on the second cache area after the swapping without carrying out synchronization between the database repository and the second cache area after the swapping. Synchronization between the first cache area after the swapping and the database repository is permitted in at least part of the second time window. Accordingly, the data processing system may carry out the synchronization between the first cache area after the swapping and the database repository.

A length of the second time window may be the same or different from that of the first time window. The length of the second window may be updated by the application automatically, depending on data derived from the following data which was obtained from past instances or in the first time window: for example, the received streaming data, the processing time of the streaming data, time required for synchronizing with the database repository, or a combination thereof. If a length of the predefined time window is updated, the updated length can be used for a subsequent time window (for example, the following second time window).

In the second time window, the data processing system may lock the whole of the first cache area on an access to the first cache area after the swapping from the application and further may lock the whole of the second cache area on an access to the second cache area after the swapping from the application. Alternatively, in the second time window, the data processing system may lock the whole of the first cache area on an access to the first cache area from the application and further may lock the second cache area on the basis of a hash index basis on an access to the second cache area from the application.

At 407, the data processing system determines whether the second time window has elapsed or not. If second time window has elapsed, the data processing system proceeds to step 408. Otherwise, the data processing system proceeds back to step 406 to repeat step 406.

At 408, upon elapse of the second time window, the data processing system re-swaps the role of the first cache area after the swapping with the role of the second cache area. Accordingly, the same processing described in 403 is performed again in a third time window and the process returns to 403.

In a case where a user selects the termination of the aforesaid process, the data processing system may terminate the process.

With reference now to FIGS. 5A and 5B, FIGS. 5A and 5B are flowcharts depicting a process of processing streaming data, in accordance with embodiments of the present disclosure.

In FIG. 5A, the subject of each operation may be a data processing system which may correspond to the computer system (101) described in FIG. 1.

At 501, the data processing system starts a part of the process. A length of a predefined window may be defined in advance manually or automatically as stated above.

At 502, the data processing system provides one or more pairs of two cache areas, a front table (F) and a back table (B), on a cache memory in the data processing system. The data processing system may specify, on the cache memory, an address used for the front table and also an address used for the back table to provide each of one or more pairs of the front table and the back table. The front table and the back table may correspond to the first cache area and the second cache area described in FIG. 4, respectively.

At 503, the data processing system determines whether a predefined time window has elapsed or not. If the predefined time window has elapsed, the data processing system proceeds to 504. Otherwise, the data processing system proceeds back to 503 until the predefined time window has elapsed.

At 504, the data processing system exchanges an address of the front table with that of the back table.

At 505, in a predefined time window (a second time window), the data processing system locks the whole of back table on an access to the back table from an application, operates a snapshot (for example, synchronization) between a memory used for the snapshot and the back table or between the database repository and the back table, and then unlocks the back table. In some embodiments, the data is further written from the memory used for the snapshot to the database. The back table may be dedicated for an operation for the snapshot. Thus, this lock is done for the whole table basis.

At 506, the data processing system locks the whole of back table on an access to the back table from the application, clears the back table, and then unlocks the back table.

After the unlock, the data processing system proceeds back to 503.

In a case where a user selects the termination of the aforesaid process, the data processing system may terminate the process.

In FIG. 5B, the subject of each step may be a system which implements the application or the data processing system which implements the application. Hereinafter, the subject of each step in FIG. 5B may simply be referred to as a computer system, but the computer system comprises the system which implements the application or the data processing system which implements the application.

At 511, the computer system starts the remaining part of the process. The remaining part may be carried out by an operation of the application.

At 512, the computer system obtains a present address of the front table.

At 513, the computer system calculates a hash index based on the streaming data which was written on the front table.

At 514, the computer system locks the front table using a hash index basis, writes incoming streaming data on the front table, and then unlocks the front table after the writing. The lock for the front table is done using the hash index basis so as to reduce the time for waiting for the locking to be released to a minimum.

After the unlock, the computer system proceeds back to step 512.

In a case where a user selects the termination of the aforesaid process, the computer system may terminate the process.

Figure 6:
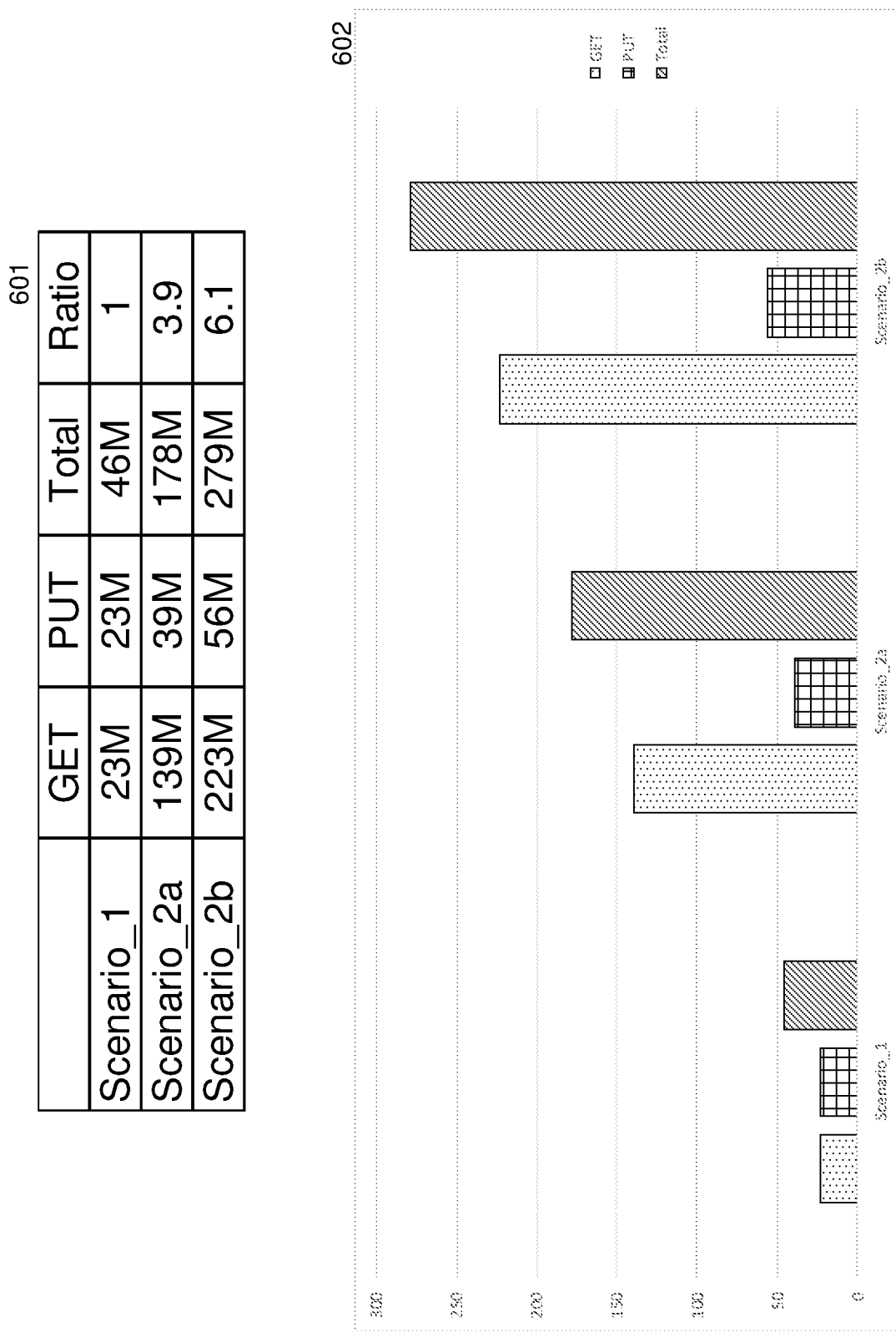
FIG. 6 depicts an example of results obtained in accordance with an embodiment of the present disclosure.

With reference now to FIG. 6, depicted is an example of results obtained in accordance with an embodiment of the present disclosure.

The following scenario of experiments was prepared: Four threads performing PUT operations, four threads performing GET operations, and one thread performing database writing operations were run five times each in a time window of ten seconds, to count the PUT and GET operations completed in a total of 50 seconds. In each of the database writing operations, lock is carried out during making a copy of the cache database image at that moment in a memory used for the snapshot, then the lock is released and the copied data in the memory used for the snapshot is written into the database repository. The memory used for the snapshot may be prepared between the cache database and database repository.

The following for experiments were conducted in the following three environments:

Scenario_1: the traditional solution described above as TS1 with an application which can read/write from a database cache and a database which synchronizes data with the database cache periodically with a table lock;

Scenario_2a: two database caches, each with a table lock, according to an embodiment of the present disclosure; and Scenario_2b: two database caches, a front table with a lock on the basis of the hash index basis and a back table with a lock of the whole of the back table, according to an embodiment of the present disclosure.

Table (601) and Graph (602) show a comparison of the number of the completed operations in 50 seconds in each of Scenario_1, Scenario_2a and Scenario_2b. The results in Table (601) shows that embodiments of the present disclosure, i.e. Scenario_2a and Scenario_2b, achieved improvement in process speed of about four to six times faster than that of the traditional solution described above, i.e. Scenario_1.

Figure 7:
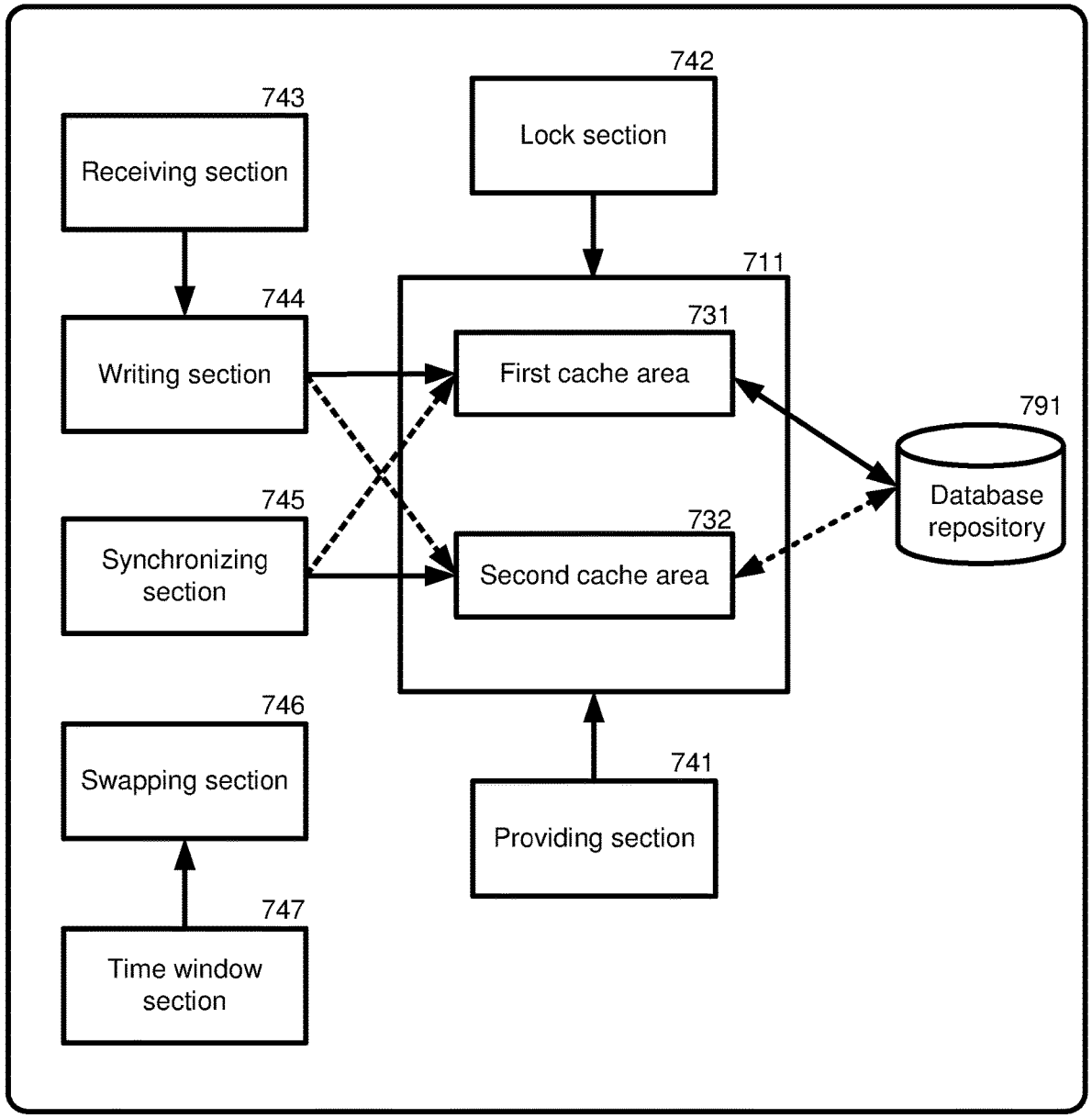
FIG. 7 is an overall functional block diagram of depicting a computer system hardware in relation to the process described in FIG. 4.

With reference now to FIG. 7, depicted is an overall functional block diagram of depicting a computer system hardware in relation to the process described in FIG. 4.

The data processing system (701) may correspond to the computer system (101) described in FIG. 1.

The data processing system (701) may comprise a cache memory (711), a providing section (741), a lock section (742), a receiving section (743), a writing section (744), a synchronizing section (745), and a swapping section (746) and optionally a time window section (747).

The cache memory (711) may have one or more pairs of a first cache area (731) and a second cache area (732).

The providing section (741) provides the pairs of a first cache area (731) and a second cache area (732) on the cache memory (711).

The lock section (742) locks on an access to the first cache area (731) on the whole of the first cache area (731) and further locks on an access to the second cache area (732) on the whole of the second cache area (732) in the first time window or locks on an access to the first cache area (731) on a hash index basis and further locks on an access to the second cache area (732) on the whole of the second cache area (732) in the first time window; locks on an access to the first cache area (731) on the whole of the first cache area (731) and further locks on an access to the second cache area (732) on the whole of the second cache area (732); or locks on an access to the first cache area (731) after the swapping on the whole of the first cache area (731) after the swapping in a second time window and further locks on an access to the second cache area (732) after the swapping on a hash index basis in a second time window.

The receiving section (743) receives streaming data in each predefined time window.

The writing section (744) writes the streaming data on the first cache area (731) without carrying out synchronization between the first cache area (731) and the database repository (791) in a first time window, and after the elapse of the first time window, writes newly incoming streaming data on the second cache area (732) after the swapping in a second time window without carrying out synchronization between the database repository (791) and the second cache area (732) after the swapping in the second time window.

The synchronizing section (745) inhibits synchronization between the first cache area (731) and the database repository (791) and carries out synchronization between the database repository (791) and the second cache area (732) in the first time window, and upon the elapse of the first time window, inhibits synchronization between the database repository (791) and the second cache area (732) after the swapping and carries out synchronization between the first cache area (731) after the swapping and the database repository (791).

The swapping section (746) swaps a role of the first cache area (731) with a role of the second cache area (732) upon the elapse of the first time window, and re-swaps the role of the first cache area (731) after the swapping with the role of the second cache area (732) after the swapping upon the elapse of the second time window.

The time window section (747) may set a predefined time window and measure the predefined time window. The time window section (747) may further define a length of a time window, depending on data derived from the following data which was obtained from past instances or one or more previous time windows: for example, the received streaming data, the processing time of the streaming data, time to be required for synchronizing with the database repository, or a combination thereof.

The present invention may be a method, a system, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for processing streaming data, comprising:
   providing a first cache area and a second cache area on a cache memory in a data processing system comprising a database repository and the cache memory for the database repository;
   receiving, in a first time window, streaming data and writing the streaming data on the first cache area;
   prohibiting, in the first time window, carrying out synchronization between the first cache area and the database repository;
   performing, in at least part of the first time window, a synchronization between the database repository and the second cache area; and
   enabling, upon elapse of the first time window, synchronization between the first cache area and the database repository.

2. The method according to claim 1, wherein the data processing system further comprises an interface with an application and further comprising:

enabling the application to access the cache memory for real-time processing of incoming streaming data.

3. The method according to claim 1, the method further comprising:

inhibiting, upon the elapse of the first time window, synchronization between the database repository and the second cache area; and writing, upon the elapse of the first time window, newly incoming streaming data on the second cache area.

4. The method according to claim 1, the method further comprising:

swapping, upon the elapse of the first time window, a role of the first cache area with a role of the second cache area;

carrying out synchronization, in a second time window, after the swapping, between the first cache area and the database repository;

writing, in the second time window, newly incoming streaming data on the second cache area;

prohibiting, in the second time window, synchronization between the second cache area and the database repository; and swapping, upon the elapse of the second time window, the role of the first cache area with the role of the second cache area.

5. The method according to claim 1, the method further comprising:

locking, in the first time window, on an access to the first cache area on the whole of the first cache area; and locking, in the first time window, on an access to the second cache area on the whole of the second cache area.

6. The method according to claim 1, the method further comprising:

locking, in the first time window, on an access to the first cache area on a hash index basis; and locking, in the first time window, on an access to the second cache area on the whole of the second cache area.

7. The method according to claim 6, the method further comprising:

swapping, upon the elapse of the first time window, a role of the first cache area with a role of the second cache area; and locking, in a second time window, on an access to the first cache area on the whole of the first cache area; and locking, in the second time window, on an access to the second cache area on the whole of the second cache area.

8. The method according to claim 1, wherein the providing the first cache area and the second cache area on the cache memory comprises providing a plurality of pairs of first cache areas and second cache areas on the cache memory, and wherein the method further comprises one of:

utilizing the plurality of pairs of cache areas are simultaneously in the same time windows; or utilizing the plurality of pairs of cache areas in each of the different time windows such that not all pairs of cache areas are utilized in the same time windows.

9. The method according to claim 4, wherein the method further comprises:

updating a length of a respective time window by the application for processing the streaming data; and utilizing the updated length for a subsequent time window.

10. The method according to claim 4, wherein a length of a respective time window is defined depending on the amount of the received streaming data, the processing time of the streaming data, time required for synchronizing with the database repository, or a combination thereof.

11. A computer program product for processing streaming data, the computer program product comprising a computer readable storage medium having program instructions embodied therewith, the program instructions executable by a computer to cause the computer to perform a method comprising:

providing a first cache area and a second cache area on a cache memory in a data processing system comprising a database repository and the cache memory for the database repository;

assigning, for a first time window, a first role to the first cache area, wherein the first role permits writing data to the cache area and prohibits synchronization between the cache area and the database repository;

assigning, for the first time window, a second role to the second cache area, wherein the second role permits synchronization between the cache area and the database repository and prohibits writing data to the cache area; and swapping, upon elapse of the first time window and the start of a second time window, the roles of the first and second cache areas such that during the second time window the first cache area is assigned the second role and the second cache area is assigned the first role.

12. The computer program product of claim 11, wherein the method further comprises:

receiving, in the first time window, streaming data; and writing the received streaming data on the first cache area.

13. The computer program product of claim 11, wherein the method further comprises:

synchronizing, during at least part of the first time window, data between the second cache area and the database repository.

14. The computer program product of claim 11, wherein the method further comprises:

writing, during the second time window, newly incoming streaming data on the second cache area.

15. The computer program product of claim 11, wherein the second role permits reading of data stored in the cache area, and wherein the method further comprises:

reading, during the first time window, by an application, data stored in the second cache area.

16. The computer program product of claim 11, wherein the first and second cache areas are components of a first pair of cache areas, and wherein providing the first and second cache areas comprises:

providing a plurality of pairs of cache areas, wherein each pair of cache areas includes, at any given time, one cache area assigned the first role and one cache area assigned the second role.

17. A data processing system comprising:

a cache memory for a database repository, wherein the cache memory comprises a plurality of cache areas including a first cache area and a second cache area;

a processor communicatively coupled to the cache memory, wherein the processor is configured to perform a method comprising:

receiving, in a first time window, streaming data;

determining that the first cache area is assigned a first role during the first time window and the second cache area is assigned a second role during the first time window, wherein:

the first role permits writing data to the cache area and prohibits synchronization between the cache area and the database repository; and the second role permits synchronization between the cache area and the database repository and prohibits writing data to the cache area; and writing, based on the first cache area being assigned the first role during the first time window and the streaming data being received in the first time window, the streaming data to the first cache area.

18. The data processing system of claim 17, wherein the method further comprises:

synchronizing, in at least part of the first time window, data between the second cache area and the database repository.

19. The data processing system of claim 17, wherein the method further comprises:

swapping, upon elapse of the first time window, the roles of the first and second cache areas such that during a second time window the first cache area is assigned the second role and the second cache area is assigned the first role.

20. The data processing system of claim 17, wherein the second role permits reading of data stored in the cache area, and wherein the method further comprises:

assigning the first and second roles to the first and second cache areas; and reading, during the first time window, by an application running on the processor, data stored in the second cache area.

* * * * *